US009247395B2

(12) United States Patent
Zheng (10) Patent No.: US 9,247,395 B2
(45) Date of Patent: Jan. 26, 2016

(54) METHOD AND APPARATUS FOR BROADCAST ASSISTANCE IN DIRECT COMMUNICATION SYSTEM (71) Applicant: Industrial Technology Research Institute, Hsinchu (TW)

(72) Inventor: Yan-Xiu Zheng, Hsinchu County (TW)

(73) Assignee: Industrial Technology Research Institute, Hsinchu (TW)

( * ) Notice: Subject to any disclaimer, the term of this patent is extended or adjusted under 35 U.S.C. 154(b) by 437 days.

(21) Appl. No.: 13/645,469

(22) Filed: Oct. 4, 2012

(65) Prior Publication Data

US 2013/0170446 A1 Jul. 4, 2013

Related U.S. Application Data (60) Provisional application No. 61/581,077, filed on Dec. 28, 2011.

(51) Int. Cl.
*H04W 4/00* (2009.01)
*H04W 4/06* (2009.01)
*H04W 72/00* (2009.01)
*H04W 74/02* (2009.01)

(52) U.S. Cl.
CPC .............. *H04W 4/06* (2013.01); *H04W 72/005* (2013.01); *H04W 74/02* (2013.01); *Y02B 60/50* (2013.01)

(58) Field of Classification Search
CPC .............. H04W 76/002–76/005; H04W 76/23
See application file for complete search history.

(56) References Cited

U.S. PATENT DOCUMENTS

| 7,920,540 | B2 | 4/2011 | Singh et al. | |
|---|---|---|---|---|
| 7,953,890 | B1 | 5/2011 | Katkar et al. | |
| 2004/0064508 | A1 | 4/2004 | Ayyagari et al. | |
| 2005/0090264 | A1 | 4/2005 | Kim | |
| 2010/0014489 | A1* | 1/2010 | Qin et al. | 370/336 |
| 2010/0110981 | A1* | 5/2010 | Shao et al. | 370/328 |
| 2010/0157974 | A1 | 6/2010 | Nichols et al. | |

(Continued)

FOREIGN PATENT DOCUMENTS

| CN | 1612511 | 5/2005 |
|---|---|---|
| CN | 1631047 | 6/2005 |

(Continued)

OTHER PUBLICATIONS

"Office Action of Korea Counterpart Application", issued on May 29, 2014, p. 1-p. 13.

(Continued)

*Primary Examiner* — Chi H Pham
*Assistant Examiner* — Fahmida Chowdhury
(74) *Attorney, Agent, or Firm* — Jianq Chyun IP Office (57) ABSTRACT A method for broadcast assistance in a direct communication system and an apparatus using the same are disclosed. The proposed method includes the following steps. A coordinator receives a broadcast assistance request message from a plurality of broadcast devices. The coordinator transmits a broadcast assistance confirmation signal to the broadcast devices and broadcasts a resource indication signal including a resource allocation. The broadcast devices respectively broadcasts an information message to at least one listening device according to the resource allocation acquired from listening to the resource indication signal, and the at least one listening device listens to one of the information messages having a category of interest according to the resource allocation acquired from listening to the resource indication signal.

17 Claims, 8 Drawing Sheets

(56) References Cited

U.S. PATENT DOCUMENTS

| | | | |
|---|---|---|---|
| 2010/0202349 A1 | 8/2010 | Guan | |
| 2010/0220669 A1 | 9/2010 | Jeon et al. | |
| 2013/0022018 A1* | 1/2013 | Jung et al. | 370/329 |
| 2013/0157656 A1* | 6/2013 | Gao et al. | 455/434 |
| 2013/0159531 A1* | 6/2013 | Katyal et al. | 709/226 |

FOREIGN PATENT DOCUMENTS

| | | |
|---|---|---|
| JP | 2011514783 | 5/2011 |
| TW | 201129207 | 8/2011 |
| TW | I351189 | 10/2011 |
| WO | 03063529 | 7/2003 |
| WO | 2011126286 | 10/2011 |

OTHER PUBLICATIONS

"Office Action of Taiwan Counterpart Application", issued on Oct. 7, 2014, p. 1-p. 9.

LAN/MAN Standards Committee IEEE Computer Society, "IEEE Standard for Local and metropolitan area networks—Part 15.4: Low-Rate Wireless Personal Area Networks (LR-WPANs)", IEEE-SA Standards Board, Jun. 16, 2011, pp. 1-334.

Tien-Wen Sung, et al., "Reliable Data Broadcast for ZigBee Wireless Sensor Networks", International Journal on Smart Sensing and Intelligent Systems, vol. 3, No. 3, Sep. 2010, pp. 504-520.

Zafer Sahinoglu, at al., "Reliable Broadcasting in ZigBee Networks", Mitsubishi Electric Research Laboratories, TR2005-029, Dec. 2005, pp. 1-13.

Li-Chun Ko, et al., "A Novel Multi-Beacon Superframe Structure with Greedy GTS Allocation for IEEE 802.15.4 Wireless PANs", IEEE, WCNC 2007 proceedings, Mar. 2007, pp. 2330-2335.

Zou You-Min, et al., "An Enhanced Scheme for the IEEE 802.15.4 Multi-hop Network", IEEE, Sep. 2006, pp. 1-4.

"Office Action of China Counterpart Application", issued on Jun. 25, 2015, p. 1-p. 8.

* cited by examiner

METHOD AND APPARATUS FOR BROADCAST ASSISTANCE IN DIRECT COMMUNICATION SYSTEM

CROSS-REFERENCE TO RELATED APPLICATION

This application claims the priority benefits of U.S. provisional application Ser. No. 61/581,077, filed on Dec. 28, 2011. The entirety of the above-mentioned patent application is hereby incorporated by reference herein and made a part of this specification.

BACKGROUND

1. Technical Field

The disclosure relates to a method and an apparatus for broadcast assistance in a direct communication system.

2. Related Art

Advertising is an attractive revenue growing service for service providers. For example, Google Inc. earns significant revenues through its advertisement services. In a cellular network, advertisements may be implemented through a broadcast function in a communication system with broadcast channels and resource indications. A base station (BS) broadcasts the resource area map of the advertisement message and broadcasts the advertisement message at the allocated area. A mobile station (MS) listens to the map and prepares to listen to the advertisement message in the allocated resource. For example, in Long Term Evolution (LTE), the map might be the region for the Physical Control Channel (PDCCH), and in the IEEE 802.16e/802.16m standards, the map might be the region for the MAP/A-MAP/EMBS-MAP. The BS then broadcasts the advertisement message on the allocated area.

An advertisement scheme can also be implemented in a direct communication system, and a general procedure for advertising in a direction communication system for one to one communication may be as follows. A device contents the resource for transmission and an access point acknowledges the transmission. The device then transmits the data. In a broadcasting scenario, the procedure can be modified to suit the situation at hand.

An approach to realize broadcasting in the direct communication system is for the broadcast device to wait for a time window. If there is no device transmitting signals, the device broadcasts the message. This approach puts the broadcast function at a low priority, even though this approach is adopted for the IEEE 802.11 standard. However, performance cannot be guaranteed when there is a plurality of direct communication devices contenting for the available resource. In some cases, such as in the broadcast transmission for streaming or video applications, equal priority may be necessary.

SUMMARY

The disclosure provides a method for broadcast assistance in a direct communication system including at least one coordinator and at least one broadcast device. The method includes the at least one coordinator executing the following steps. A broadcast assistance request message is received from the broadcast devices. Moreover, a resource indication signal including a resource allocation is broadcasted.

The disclosure provides a coordinator for broadcast assistance in a direct communication system including at least one of the coordinator and at least one broadcast device. The coordinator includes a communication protocol module configured for receiving a broadcast assistance request message from the broadcast devices and broadcasting a resource indication signal including a resource allocation.

The disclosure provides a method for broadcast assistance in a direct communication system including at least one coordinator and at least one broadcast device. The method includes the broadcast devices executing the following steps. A broadcast assistance request message is transmitted to the at least one coordinator. A broadcast assistance confirmation signal is received from the at least one coordinator. Moreover, an information message is respectively broadcasted.

The disclosure provides a broadcast device for broadcast assistance in a direct communication system including at least one coordinator and at least one broadcast device. The broadcast device includes a communication protocol module configured for transmitting a broadcast assistance request message to the at least one coordinator, receiving a broadcast assistance confirmation signal from the at least one coordinator, and respectively broadcasting an information message.

The disclosure provides a method for broadcast assistance in a direct communication system including at least one coordinator and at least one listening device. The method includes the at least one listening device executing the following steps. A resource indication signal broadcasted by the at least one coordinator is listened to, in which the resource indication signal is broadcasted by the at least one coordinator after receiving a broadcast assistance request message and transmitting a broadcast assistance confirmation signal. Moreover, an information message having a category of interest is listened to according to the resource allocation acquired from listening to the resource indication signal.

The disclosure provides a listening device for broadcast assistance in a direct communication system including at least one coordinator and at least one listening device. The listening device includes a communication protocol module configured for listening to a resource indication signal broadcasted by the at least one coordinator, in which the resource indication signal is broadcasted by the at least one coordinator after receiving a broadcast assistance request message and transmitting a broadcast assistance confirmation signal. Moreover, the communication protocol module is configured for listening to an information message having a category of interest according to the resource allocation acquired from listening to the resource indication signal.

Several exemplary embodiments accompanied with figures are described in detail below to further describe the disclosure in details.

BRIEF DESCRIPTION OF THE DRAWINGS

The accompanying drawings are included to provide further understanding, and are incorporated in and constitute a part of this specification. The drawings illustrate exemplary embodiments and, together with the description, serve to explain the principles of the disclosure.

DETAILED DESCRIPTION OF DISCLOSED EMBODIMENTS

Figure 1:
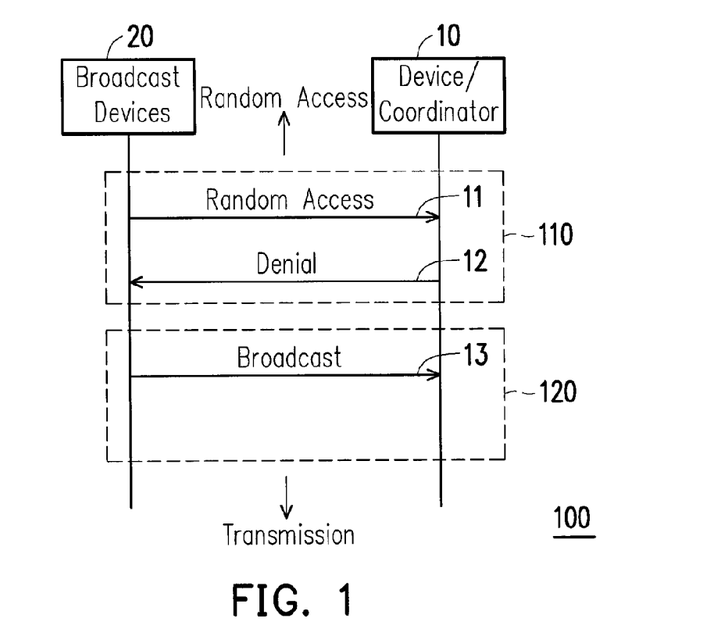
FIG. 1 is a flow diagram of a broadcast method in a direct communication system.

With reference to FIG. 1, a flow diagram of a broadcast method in a direct communication system is illustrated, in which broadcasting in a direct communication system 100 may be accomplished by performing a random access step 110 and a transmission step 120. During the random access step 110, a broadcast device 20 sends a random access signal 11 to announce a broadcast message 13.

A device or a coordinator 10 listens to the random access signal 11. When the device or coordinator 10 receives the random access signal 11, the device or coordinator 10 can send a "Denial" signal 12 to stop the broadcast device 20 from broadcasting. During the transmission step 120, the broadcast device 20 can send the broadcast message 13 if the broadcast device 20 does not receive any further message to halt the transmission.

Figure 2:
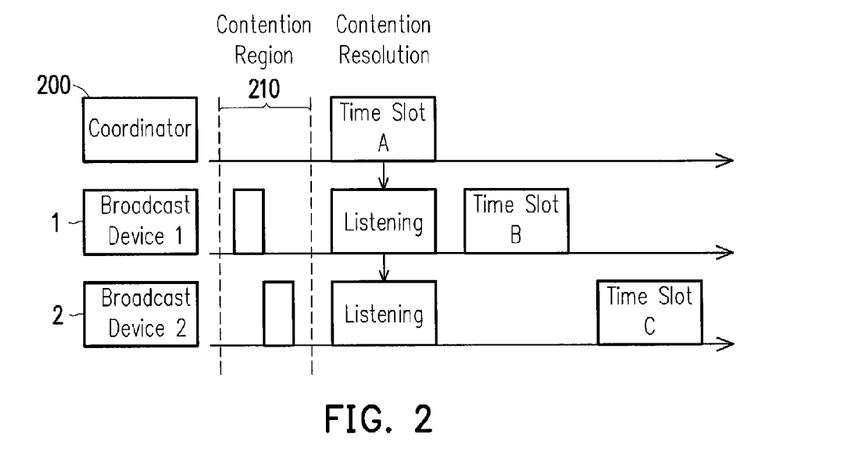
FIG. 2 illustrates a timing relationship between a coordinator and two broadcast devices in a direct communication system.

In the random access step 110, the coordinator 10 can further allocate resource to the broadcast device 20 if multiple broadcast devices 20 transmit at the same time to increase the successful transmission opportunities of the broadcast message 13. FIG. 2 illustrates a timing relationship between a coordinator 200 and two broadcast devices 1 and 2 in the direct communication system 100. Both broadcast devices 1 and 2 content for the transmission opportunity. At a time slot A, the coordinator 200 indicates the resource for both broadcast devices 1 and 2. Both broadcast devices 1 and 2 transmit at a different time (time slots B and C) to avoid transmission collision at the transmission step. In this scenario, the coordinator 200 does not send the "Denial" message but instead message to allow the broadcast devices 1 and 2 to broadcast signal.

Figure 1A:
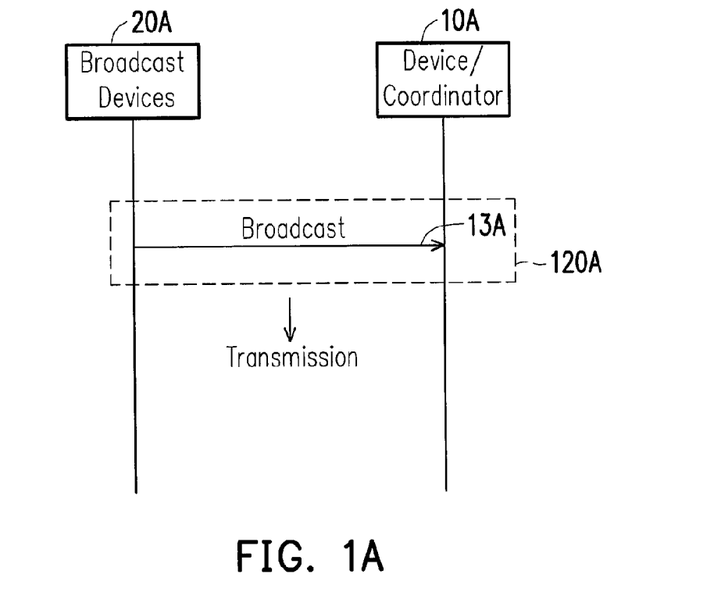
FIG. 1A is a flow diagram of another broadcast method in a direct communication system.

The procedure depicted in FIG. 1 may be further modified, as shown in FIG. 1A. If the resource is pre-allocated, the broadcast device 20A can broadcast at a pre-defined region. That is, the random access step 110 depicted in FIG. 1 can be ignored because the resource has been authorized, and the broadcast device 20A can directly send a broadcast message 13A to a device or coordinator 10A. On the other hand, the procedure of FIG. 1 may also be modified such that the "Denial" signal 12 can be ignored.

The random access step 110 can be limited in a contention region 210 depicted in FIG. 2 to facilitate the coordinator 10 for allocating the resource or interlacing the transmissions of the two broadcast devices 1 and 2. FIG. 2 depicts the contention region 210 for the broadcast devices 1 and 2 to content for the resource, in which the device or coordinator 10 can only listen to signals on the contention interval. If there is no random access signal, the device or coordinator 10 can be turned off to save power.

When the number of direct communication devices is large, three issues arise. The first issue is the contention-induced resource wastage. Since a large number of devices content at the same time, when collisions increase, the resource contention fails. The second issue is the lower resource utilization due to the long wait time. If a broadcast device can only broadcast or advertise a message when there is no transmission, the broadcast device may wait for a long time to get a transmission opportunity. As the wait time becomes longer, the more resource is wasted. The third issue is the significant power consumption on the listening device, which has to listen to all broadcasted messages to acquire the message of interest. The listening device consumes extra power for the redundant message listening.

In order to mitigate these issues, a coordinator according to an exemplary embodiment of the disclosure can provide assistance for the broadcast/advertisement of the broadcast devices. For instance, the coordinator can reserve a resource for a broadcast device. The reserved resource can not be contented for by other devices which are not allowed to transmit at this resource. The device allocated to use this resource can broadcast/advertise without contention. The timing of the scheduled broadcast/advertisement is predicable for all of the listening devices. Moreover, the content categories of these broadcast devices can be further identified or broadcasted with the assistance of the coordinator. The coordinator can classify a message from these broadcast devices for the listening devices if the message has a category of interest. Furthermore, a charging system can bill the broadcast devices for the allowed resource.

Figure 3:
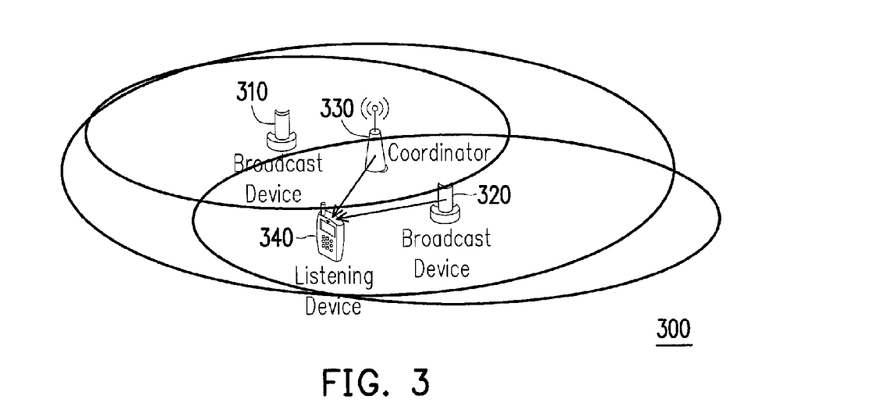
FIG. 3 is a schematic view of a direct communication system according to an exemplary embodiment.

FIG. 3 is a schematic view of a direct communication system according to an exemplary embodiment. With reference to FIG. 3, in an exemplary embodiment, the broadcast devices 310 and 320 request a coordinator 330 for broadcast assistance in a direct communication system 300. The coordinator 330 broadcasts a resource indication signal including a resource allocation for the broadcast devices 310 and 320. An associated category of the broadcast message may be broadcasted as well. A listening device 340 listens to the resource indication signal from the coordinator 330 and listens to an information message from the broadcast device 320 having a category of interest.

Figure 4:
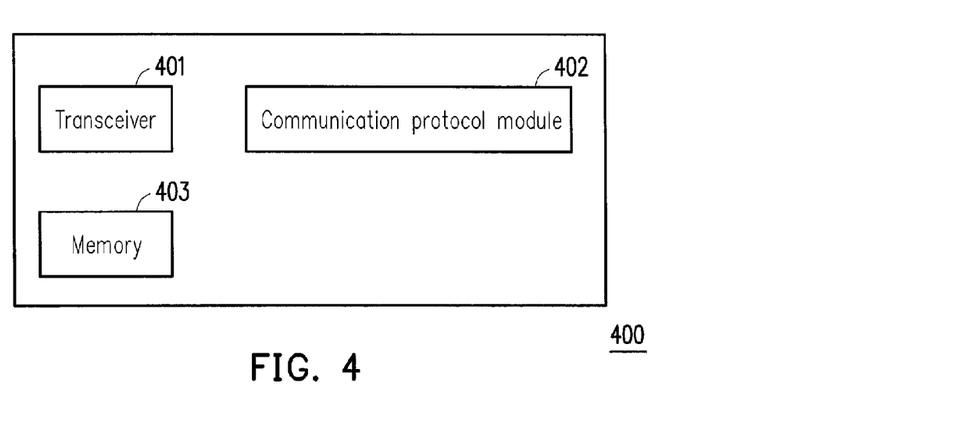
FIG. 4 is a functional block diagram of a coordinator according to an exemplary embodiment.

FIG. 4 is a functional block diagram of a coordinator according to an exemplary embodiment. Referring to FIG. 4, a coordinator 400 may include a transceiver 401, a communication protocol module 402, and a memory 403. The transceiver 401 and the memory 403 may be both connected to the communication protocol module 402.

With reference to FIGS. 3 and 4, the transceiver 401 is configured to transmit and receive signals from the broadcast devices 310 and 320 within the coverage range thereof. The transceiver 401 may perform analog-to-digital signal conversion (ADC), digital-to-analog signal conversion (DAC), modulation, demodulation, signal amplification, low-pass filtering, and bandpass filtering. The transceiver 401 is, for example, configured to provide information of a received signal to the communication protocol module 402, modulate data received from the communication protocol module 402 into a modulated signal, and transmit the modulated signal to the broadcast devices 310 and 320 or to other devices in the direct communication system 300.

The communication protocol module 402 may be connected to the transceiver 401. The communication protocol module 402 is configured for receiving a broadcast assistance request message from the broadcast devices 310 and 320 and processing a command in the message (or executing corresponding operations according to parameters in the message). The communication protocol module 402 may include a processor (not drawn) and an embedded software or firmware program. The embedded software or firmware program may include program codes of a communication protocol stack. When the processor of the communication protocol module 402 executes the program codes of the communication protocol stack, the communication protocol module 402 can be configured for executing various procedures in a method for broadcast assistance in the direct communication system 300 (which will be described below in the embodiments illustrated in FIG. 5-11). In addition, the memory 403 may be configured for temporarily storing parameters used in the procedures. The coordinator 330 may further include other components (not shown), such as an antenna module to accomplish the aforementioned functions of the transceiver 401, the communication protocol module 402, and the memory 403.

In the disclosure, it should be appreciated that the listening device 340, the coordinator 330, and the broadcast devices 310 and 320 depicted in FIG. 3 may be a user equipment (UE), a mobile station (MS), an advanced mobile station (AMS), a wireless terminal communication device, a M2M device, or a MTC device. Moreover, the devices may also be a digital television (TV), a digital set-top box, a personal computer (PC), a notebook computer, a tablet computer, a netbook, a mobile phone, a smart mobile phone, a water meter, a gas meter, a watt-hour meter, an alarm, a sensor, or a monitor. Furthermore, the broadcast devices 310 and 320 and the coordinator 330 depicted in FIG. 3 may be advanced base stations, node B systems, or evolved node Bs (eNBs). It should be further appreciated that the listening device 340 and the broadcast devices 310 and 320 may also include similar elements as those contained in the coordinator 330, such as the transceiver 401, the communication protocol module 402, and the memory 403 depicted in FIG. 4.

It should be further noted that the quantity of the coordinator 330, the broadcast devices 310 and 320, and the listening devices 340 are not restricted to the numbers used in the disclosure for illustrative purposes. For instance, in other embodiments of the disclosure, there may be more than one coordinator 330, more than two broadcast devices 310 and 320, and more than one listening device 340, for example, and one skilled in the art can adjust the methods and apparatuses disclosed herein to suit a particular situation.

Figure 5:
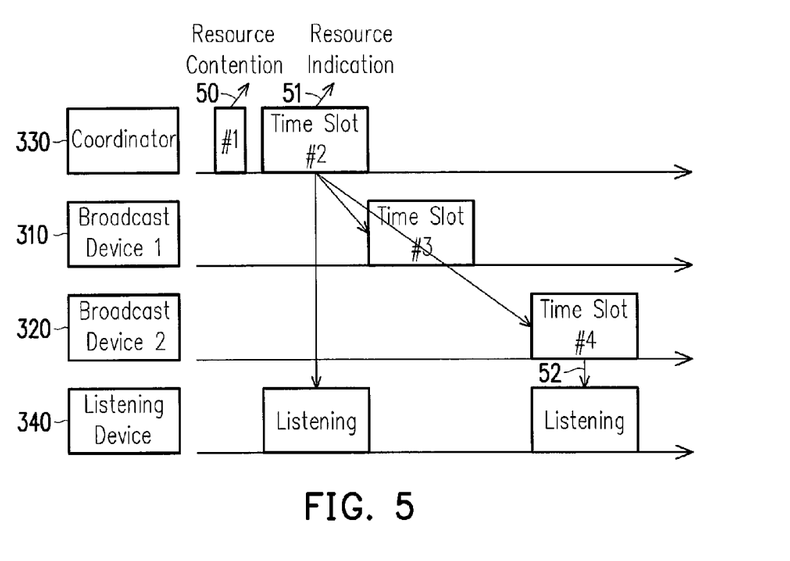
FIG. 5 illustrates a timing relationship among a coordinator and two broadcast devices according to an exemplary embodiment.

FIG. 5 illustrates a timing relationship among the coordinator 330 and the broadcast devices 310 and 320 according to an exemplary embodiment. The coordinator 330 may content for a resource 50 to broadcast the associated information. The coordinator may apply a contention in a time slot #1 to ensure all devices can listen to the broadcast information, where the priority of contention might be higher than some devices. The coordinator 330 broadcasts a resource indication signal 51 at a time slot #2 after time slot #1, and the broadcast devices 310 and 320 and the listening device 340 may listen to the resource indication signal at time slot #2 to acquire the corresponding resource allocation. The resource indication signal allocates the resource for the broadcast devices 310 and 320 to respectively broadcast at time slots #3 and #4, and for the listening device 340 to listen to an information message 52 having a category of interest from the broadcast device 320 at time slot #4.

Figure 6:
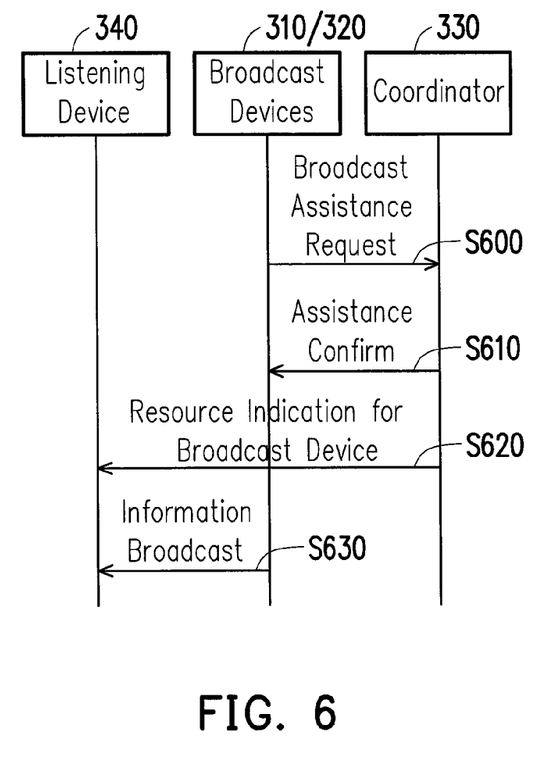
FIG. 6 is a flow diagram of a method for broadcast assistance in a direct communication system according to an exemplary embodiment.

FIG. 6 is a flow diagram of a method for broadcast assistance in a direct communication system according to an exemplary embodiment. In Step S600, the broadcast devices 310 and 320 transmit a broadcast assistance request message to the coordinator 330. In Step S610, the coordinator 330 confirms the broadcast assistance request by transmitting a broadcast assistance confirmation signal to the broadcast devices 310 and 320. In Step S620, the coordinator 330 then broadcasts a resource indication signal including a resource allocation. In Step S630, the broadcast devices 310 and 320 respectively broadcast an information message to the at least one listening device according to the resource allocation acquired from listening to the resource indication signal. Moreover, the listening device 340 listens to one of the information messages having a category of interest according to the resource allocation acquired from listening to the resource indication signal.

Figure 7:
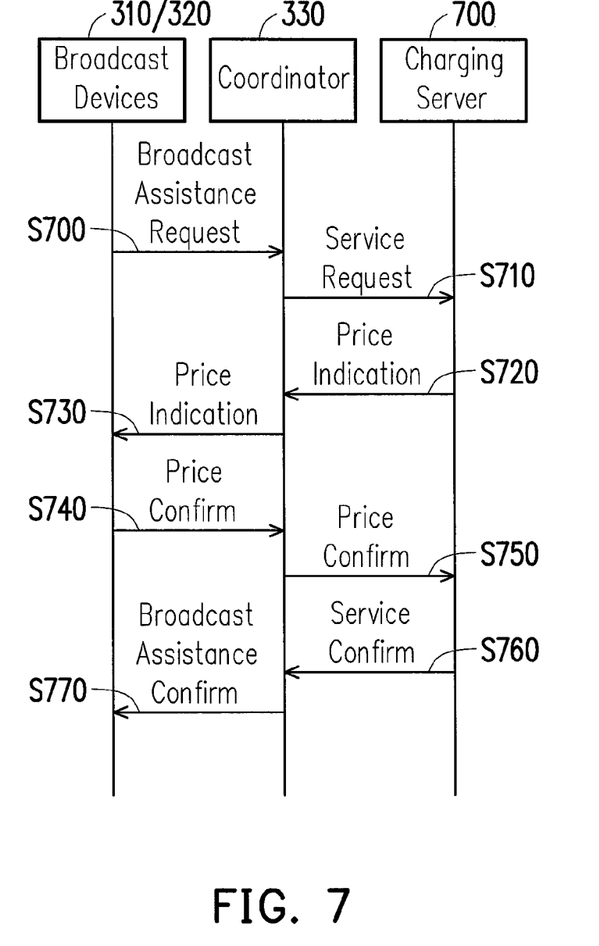
FIG. 7 is a flow diagram of another method for broadcast assistance in a direct communication system according to an exemplary embodiment.

FIG. 7 is a flow diagram of another method for broadcast assistance in a direct communication system according to an exemplary embodiment. The method for broadcast assistance depicted in FIG. 7 is similar to the method illustrated in FIG. 6, with a difference being the additional association with a charging server 700 in the method embodied in FIG. 7. In Step S700, the broadcast devices 310 and 320 transmit a broadcast assistance request message to the coordinator 330. In Step S710, the coordinator 330 then transmits a pricing service request to the charging server 700. In Step S720, the charging server 700 allocates a price for the broadcast assistance request, and the coordinator 330 receives a price indication message from the charging server 700. In Step S730, the coordinator 330 transmits the price indication message to the broadcast devices 310 and 320. In Step S740, the broadcast devices 310 and 320 confirm the price for the broadcast assistance request to the coordinator 330 by transmitting a price confirmation signal to the coordinator 330. In Step S750, the coordinator 330 confirms the price for the broadcast assistance request to the charging server 700 by transmitting the price confirmation signal to the charging server 700. In Step S760, the charging server 700 transmits a pricing service confirmation signal to the coordinator 330. It should be noted that, the charging server 700 may command multiple coordinators for broadcast assisting the broadcast devices 310 and 320 to enhance the reception probability of the broadcast information. In Step S770, the coordinator 330 confirms the broadcast assistance request by transmitting a broadcast assistance confirmation signal to the broadcast devices 310 and 320.

Figure 8:
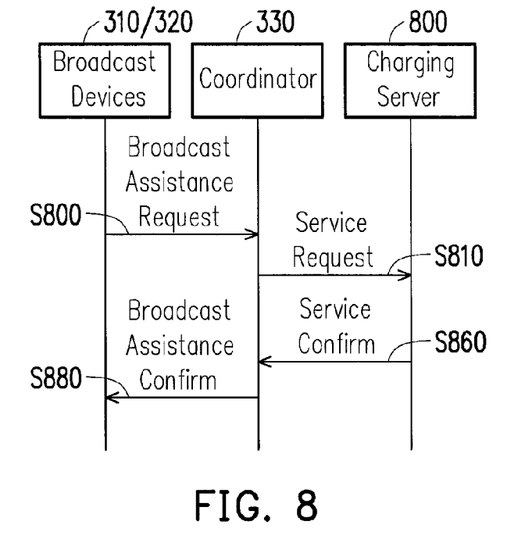
FIG. 8 illustrates a flow diagram of a procedure associated with a charging server according to an exemplary embodiment.
Figure 9:
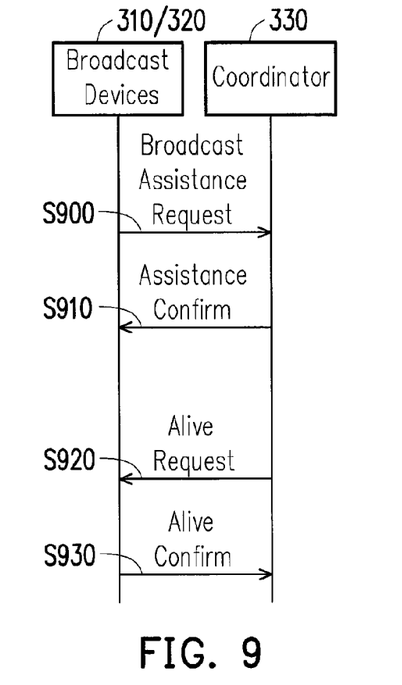
FIG. 9 illustrates a flow diagram of a procedure for resource acquisition and release according to an exemplary embodiment.

The steps of price indication from charging server to coordinator (S720), price indication from coordinator 330 to the broadcast devices 310 and 320 (S730), price confirmation from the broadcast devices 310 and 320 to the coordinator 330 (S740), and price confirmation from the broadcast devices 310 and 320 to the charging server 700 (S750) can be ignored if the broadcast devices 310 and 320 have been authorized in the charging server 700. FIG. 8 illustrates a flow diagram of a procedure associated with a charging server 800 according to another exemplary embodiment, in which Steps S800, S810, S860, and S880 are the same as Steps S700, S710, S760, and S780 in FIG. 7, and thus further elaboration thereof is omitted hereafter.

In one embodiment of the disclosure, when the broadcast devices 310 and 320 request for broadcast assistance from the coordinator 330, the coordinator 330 may broadcast for a duration. The coordinator 330 may execute one of three procedures to terminate the broadcast assistance. A first procedure of resource acquisition and release according to an exemplary embodiment is illustrated in a flow diagram of FIG. 9, where Steps 900 and 910 are the same as the broadcast assistance request and confirmation steps S600 and S610 in FIG. 6. The first procedure includes the coordinator 330 transmitting a status query message to the broadcast devices 310 and 320 so as to determine whether the broadcast devices 310 and 320 are in an alive state (Step S920). The broadcast assistance is continuously performed when the broadcast devices indicate an alive state (Step S930), and the broadcast assistance is terminated when the broadcast devices indicate an off-line state or broadcast devices does not respond Step S920. A second procedure includes the coordinator 330 terminating the broadcast assistance after a predetermined duration. If the coordinator 330 receives the broadcast assistant request message before the termination of the broadcast assistance, the coordinator 330 resets the broadcast assistance, where the received broadcast assistant request message might be different to message sent in S900. A third procedure includes the coordinator 330 listening to status information from the broadcast devices 310 and 320 and terminating the broadcast assistance when no status information has been received.

Figure 10:
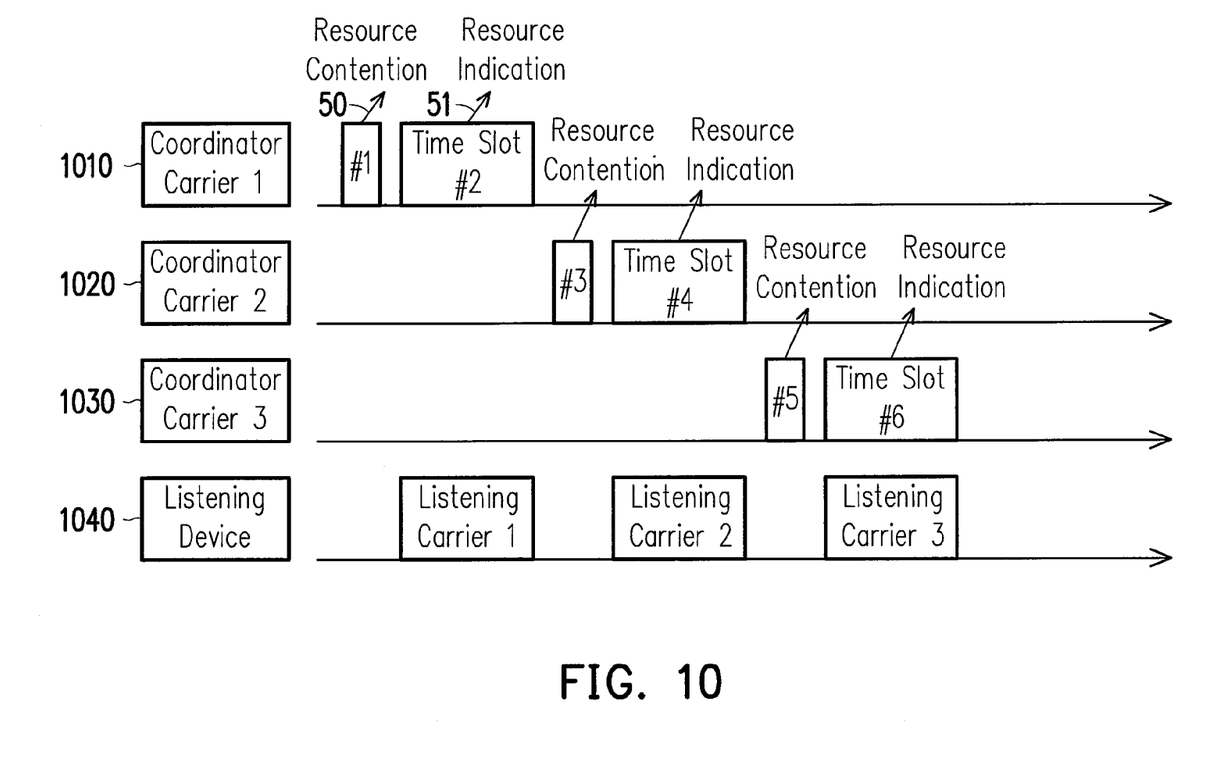
FIG. 10 illustrates a timing relationship of a method for broadcast assistance in a direct communication system connected in a network supporting three carriers according to an exemplary embodiment.

In some instances, the broadcast service may require more resources due to the insufficient allocated resources. According to some embodiments of the disclosure, methods for multi-carrier broadcast assistance may be adopted to enhance the capacity of the broadcast service. In FIG. 10, at least two interlaced information broadcasting is shown in a timing relationship of a method for broadcast assistance in a direct communication system connected in a network supporting at least two carriers according to an exemplary embodiment. In FIG. 10, the coordinators 1010, 1020, and 1030 on different carriers 1, 2, and 3 interlace their resource indication intervals at time slots #2, #4, and #6. The coordinators 1010, 1020, and 1030 may content for resources at time slots #1, #3, and #5. If the contention of resources at time slots #1, #3 and #5 is not necessary in the entire procedure, time slots #1, #3 and #5 could be removed in FIG. 10. Moreover, a listening device 1040 can listen to each resource indication signal broadcasted from the coordinators 1010, 1020, and 1030 at time slots #2, #4, and #6 on carriers 1, 2, and 3. However, this interlacing approach for multi-carrier broadcast assistance is not limited to the aforementioned three carrier case. In a direct communication system according to another embodiment, each resource indication signal is respectively broadcasted by the at least one coordinator in an interlaced manner on multiple carriers. Moreover, a resource to broadcast the resource indication signal is contented and each resource indication signal is broadcasted on consecutive time slots of each carrier, and the at least one listening device listens to each resource indication signal at the time slot the resource indication signal is broadcasted.

Figure 11:
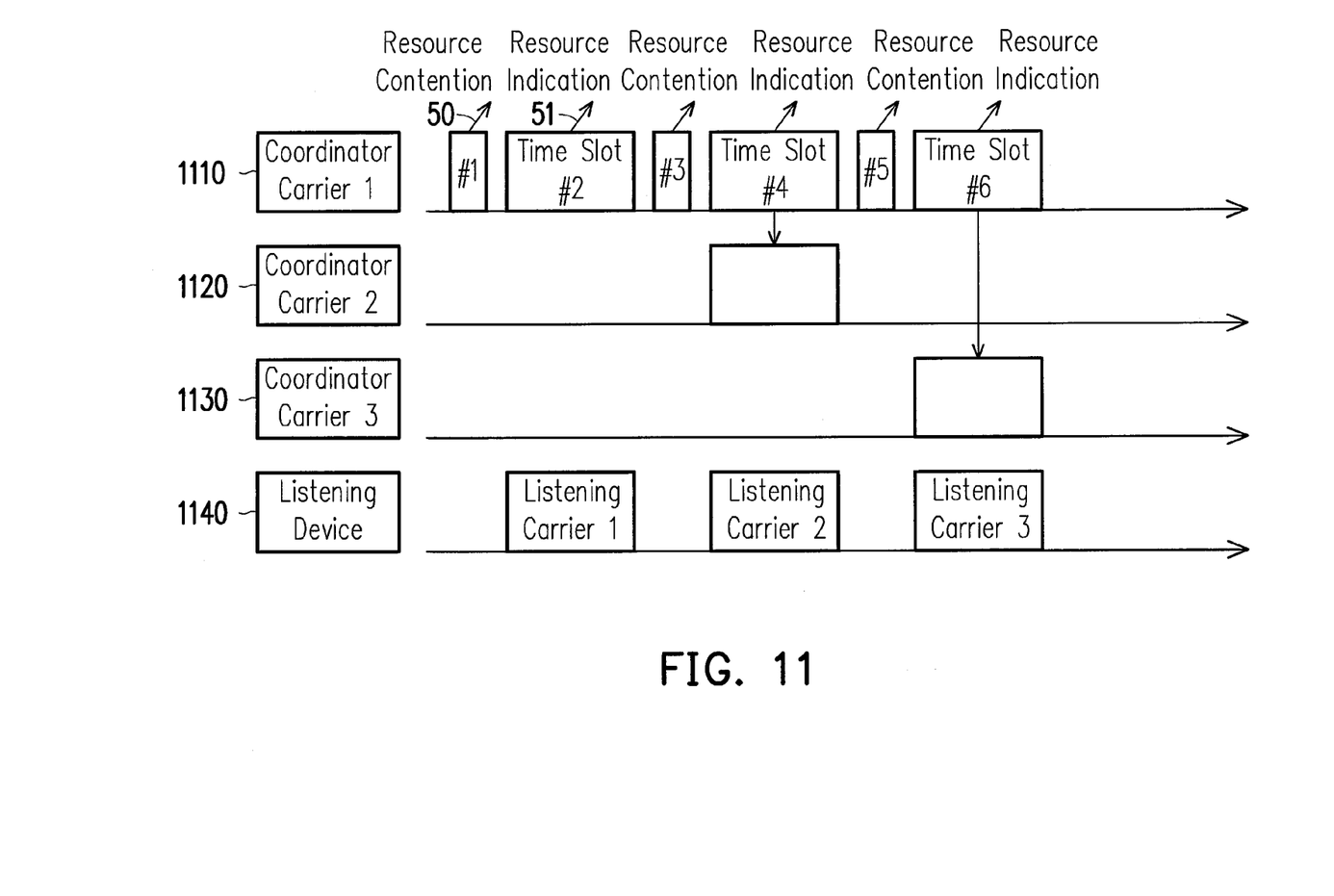
FIG. 11 illustrates a timing relationship of a method for broadcast assistance in a direct communication system connected in a network supporting three carriers according to an exemplary embodiment.

Another approach for multi-carrier broadcast assistance is depicted in FIG. 11. In FIG. 11, cross-carrier indication is shown in a timing relationship of a method for broadcast assistance in a direct communication system connected in a network supporting three carriers according to an exemplary embodiment. In FIG. 11, a listening device 1140 listens on a carrier 1 and a coordinator 1110 broadcasts the resource indication signals among the three carriers 1, 2, and 3, for example. In this cross-carrier approach, each of the coordinators 1110, 1120, and 1130 can indicate resource on different carriers. The listening device 1140 can listen to the information message on a same carrier and acquire information on different carriers when needed. For example, as shown in FIG. 11, the resource indication signals for each of the carriers 1-3 can be broadcasted at time slots #2, #4, and #6 on carrier 1 by the coordinator 1110, and the listening device 1140 can listen at time slots #2, #4, and #6 on carrier 1. The resource contention for time slots #1, #3 and #5 on carrier 1 may be further included when resource contention is necessary. Accordingly, the listening device 1140 can acquire broadcasted messages on a single carrier. However, this cross-carrier indication approach for multi-carrier broadcast assistance is not limited to the aforementioned three carrier case. In a direct communication system according to another embodiment, the resource indication signal on multiple carriers is respectively broadcasted on one of the carriers by the at least one coordinator. Moreover, a resource to broadcast each resource indication signal is contented and each resource indication signal is broadcasted on consecutive time slots of one of the carriers, and the at least one listening device listens to each resource indication signal on one of carriers at the time slot the resource indication signal is broadcasted.

In view of the foregoing, the disclosure provides methods and apparatuses for broadcast assistance in a direct communication system. The broadcast devices transmit a broadcast assistance request message to the coordinator. The coordinator confirms the broadcast assistance request by transmitting a broadcast assistance confirmation signal to the broadcast devices. The coordinator then broadcasts a resource indication signal including a resource allocation. The broadcast devices respectively broadcasts an information message to the at least one listening device according to the resource allocation acquired from listening to the resource indication signal. Moreover, the listening device listens to one of the information messages having a category of interest according to the resource allocation acquired from listening to the resource indication signal. A charging server may also be associated in order to determine a price of the broadcast assistance request. For multi-carrier broadcast assistance, interlaced information broadcasting or cross-carrier indication can enhance the capacity of the broadcast service. Accordingly, the methods and apparatuses provided in the disclosure can reduce contention-induced resource shortage as well as lower power consumption on the listening device.

It will be apparent to those skilled in the art that various modifications and variations can be made to the structure of the disclosed embodiments without departing from the scope or spirit of the disclosure. In view of the foregoing, it is intended that the disclosure cover modifications and variations of this disclosure provided they fall within the scope of the following claims and their equivalents.

What is claimed is:

1. A method for broadcast assistance in a direct communication system comprising at least one coordinator and at least one broadcast device, the method comprising:
the at least one coordinator executing the following steps:
receiving a broadcast assistance request message from the broadcast device; and
broadcasting a resource indication signal comprising a resource allocation,
wherein after the step of receiving the broadcast assistance request message from the broadcast devices, the method further comprises:
the at least one coordinator transmitting a broadcast assistance confirmation signal to the broadcast device,
wherein after the step of transmitting the broadcast assistance confirmation signal to the broadcast devices, the method further comprises:

the at least one coordinator contenting in a first time slot for a resource to broadcast the resource indication signal, the coordinator applying a high priority contention in the first time slot.

2. The method of claim 1, wherein the at least one coordinator broadcasts the resource indication signal at a second time slot after the first time slot.

3. The method of claim 1, the method further comprises:
the at least one coordinator executing the following steps:
receiving a price indication message from a charging server in response to a pricing service request being transmitted to a charging server;
receiving a price confirmation signal from the broadcast devices in response to the price indication message being transmitted to the broadcast devices; and
receiving a pricing service confirmation signal from the charging server in response to the price confirmation signal being transmitted to the charging server.

4. The method of claim 1, wherein after the step of transmitting the broadcast assistance confirmation signal to the broadcast devices, the method further comprises:
the at least one coordinator transmitting a status query message to the broadcast devices so as to determine whether the broadcast devices are in an alive state, wherein the broadcast assistance is continuously performed when the broadcast devices indicate an alive state, and the broadcast assistance is terminated when the broadcast devices indicate an off-line state.

5. The method of claim 1, wherein the at least one coordinator terminates the broadcast assistance after a predetermined duration, and restarts the broadcast assistance after receiving the broadcast assistance request message from the broadcast devices again.

6. The method of claim 1, wherein the at least one coordinator listens to a status information from the broadcast devices and terminates the broadcast assistance when no status information has been received.

7. The method of claim 1, wherein each resource indication signal is respectively broadcasted by the at least one coordinator in an interlaced manner on multiple carriers, a resource to broadcast the resource indication signal being contented and each resource indication signal being broadcasted on consecutive time slots of each carrier, and the at least one listening device listens to each resource indication signal at the time slot the resource indication signal is broadcasted.

8. The method of claim 1, wherein the resource indication signal on multiple carriers is respectively broadcasted on one of the carriers by the at least one coordinator, a resource to broadcast each resource indication signal being contented and each resource indication signal being broadcasted on consecutive time slots of one of the carriers, and the at least one listening device listens to each resource indication signal on one of carriers at the time slot the resource indication signal is broadcasted.

9. A method for broadcast assistance in a direct communication system comprising at least one coordinator and at least one broadcast device, the method comprising:
the broadcast devices executing the following steps:
transmitting a broadcast assistance request message to the at least one coordinator;
receiving a broadcast assistance confirmation signal from the at least one coordinator; and
respectively broadcasting an information message,
wherein contents of the at least one coordinator are in a first time slot for a resource to broadcast the resource indication signal before transmitting the broadcast assistance confirmation signal to the broadcast devices, the at least one coordinator applying a high priority contention in the first time slot.

10. The method of claim 9, wherein the at least one coordinator broadcasts the resource indication signal in a second time slot after the first time slot.

11. The method of claim 9, wherein before transmitting the broadcast assistance confirmation signal to the broadcast devices, the at least one coordinator transmits a pricing service request to a charging server, receives a price indication message from the charging server and transmits the price indication message to the broadcast devices, receives a price confirmation signal from the broadcast devices and transmits the price confirmation signal to the charging server, and receives a pricing service confirmation signal from the charging server.

12. The method of claim 9, wherein after transmitting the broadcast assistance confirmation signal to the broadcast devices, the at least one coordinator transmits a status query message to the broadcast devices so as to determine whether the broadcast devices are in an alive state, the broadcast assistance being continuously performed when the broadcast devices indicate an alive state, and the broadcast assistance being terminated when the broadcast devices indicate an off-line state.

13. The method of claim 9, wherein the at least one coordinator terminates the broadcast assistance after a predetermined duration, and restarts the broadcast assistance after receiving the broadcast assistance request message from the broadcast devices again.

14. The method of claim 9, wherein the at least one coordinator listens to a status information from the broadcast devices and terminates the broadcast assistance when no status information has been received.

15. The method of claim 9, wherein each resource indication signal is respectively broadcasted by the at least one coordinator in an interlaced manner on multiple carriers, a resource to broadcast the resource indication signal being contented and each resource indication signal being broadcasted on consecutive time slots of each carrier, and the at least one listening device listens to each resource indication signal at the time slot the resource indication signal is broadcasted.

16. The method of claim 9, wherein the resource indication signal on multiple carriers is respectively broadcasted on one of the carriers by the at least one coordinator, a resource to broadcast each resource indication signal being contented and each resource indication signal being broadcasted on consecutive time slots of one of the carriers, and the at least one listening device listens to each resource indication signal on one of carriers at the time slot the resource indication signal is broadcasted.

17. A method for broadcast assistance in a direct communication system comprising at least one coordinator and at least one listening device, the method comprising:
the at least one listening device executing the following steps:
listening to a resource indication signal broadcasted by the at least one coordinator, wherein the resource indication signal is broadcasted by the at least one coordinator after receiving a broadcast assistance request message and transmitting a broadcast assistance confirmation signal; and
listening to an information message having a category of interest according to the resource allocation acquired from listening to the resource indication signal, wherein the direct communication system further comprises a plurality of broadcast devices, wherein the listening device listens to the resource indication signal to acquire the corresponding resource allocation, wherein each of the broadcast devices respectively broadcasts the corresponding information message at a time slot after the second time slot according to the corresponding resource allocation; and the at least one listening device listens to one of the information messages having the category of interest from one of the broadcast devices at the corresponding time slot.

* * * * *